(12) United States Patent
Yu et al.

(10) Patent No.: US 7,908,469 B2
(45) Date of Patent: Mar. 15, 2011

(54) METHOD FOR EXECUTING POWER ON SELF TEST ON A COMPUTER SYSTEM AND UPDATING SMBIOS INFORMATION PARTIALLY

(75) Inventors: Ling-Hung Yu, Taipei (TW); Ying-Chih Lu, Taipei (TW); Chun-Yi Lee, Gueishan Township, Taoyuan County (TW); Chi-Tsung Chang, Taipei (TW); Meng-Hua Cheng, Yongjing Township, Jhanghua County (TW); Chun-Lung Wu, Taipei (TW)

(73) Assignee: Inventec Corporation, Taipei (TW)

( * ) Notice: Subject to any disclaimer, the term of this patent is extended or adjusted under 35 U.S.C. 154(b) by 727 days.

(21) Appl. No.: 11/985,149

(22) Filed: Nov. 13, 2007
(Under 37 CFR 1.47)

(65) Prior Publication Data

US 2008/0072029 A1 Mar. 20, 2008

Related U.S. Application Data

(63) Continuation-in-part of application No. 11/095,782, filed on Mar. 30, 2005, now abandoned.

(51) Int. Cl.
*G06F 9/00* (2006.01)
*G06F 9/44* (2006.01)

(52) U.S. Cl. .................. 713/1; 713/2; 717/168
(58) Field of Classification Search .............. 713/1, 2, 713/100
See application file for complete search history.

(56) References Cited

U.S. PATENT DOCUMENTS

| 6,122,732 | A  | * | 9/2000  | Ahuja ............... 713/1     |
| 7,017,040 | B2 | * | 3/2006  | Singer et al. ......... 713/2  |
| 7,213,152 | B1 | * | 5/2007  | Gafken et al. ....... 713/187  |
| 7,512,777 | B2 | * | 3/2009  | Wang ................. 713/1    |
| 7,562,210 | B2 | * | 7/2009  | Zhang et al. ......... 713/2   |
| 2004/0221147 | A1 | * | 11/2004 | Tseng et al. ......... 713/1  |
| 2006/0168386 | A1 | * | 7/2006  | Mudusuru et al. ...... 710/267 |

* cited by examiner

*Primary Examiner* — Suresh K Suryawanshi
(74) *Attorney, Agent, or Firm* — J.C. Patents

(57) ABSTRACT

A method for executing the power on self test (POST) on the computer system and a method for updating the SMBIOS information partially are provided for a computer system with a first memory and a second memory, wherein the first memory comprises a first storage block and a second storage block. A user can previously set the specific SMBIOS information in the second storage block. And during the POST stage, the default SMBIOS information in the BIOS code loaded from the first storage block to the second memory will be partially updated according to the specific SMBIOS information set by the user. As a result, the purpose of using the appropriated SMBIOS information to initiate the computer system can be achieved.

18 Claims, 2 Drawing Sheets

METHOD FOR EXECUTING POWER ON SELF TEST ON A COMPUTER SYSTEM AND UPDATING SMBIOS INFORMATION PARTIALLY

CROSS-REFERENCE TO RELATED APPLICATION

This application is a continuation-in-part of a prior application Ser. No. 11/095,782, filed Mar. 30, 2005 now abandoned. The entirety of the above-mentioned patent application is hereby incorporated by reference herein and made a part of this specification.

BACKGROUND OF THE INVENTION

1. Field of the Invention

The present invention relates to a method for executing a power on self test (POST). More particularly, the present invention relates to the method for executing the POST on a computer system with a system management BIOS (SMBIOS) information inputted by a user, and relates to a method for updating the SMBIOS information partially.

2. Description of Related Art

Basic input/output system (BIOS) code is the most fundamental firmware among the computer architecture nowadays. The BIOS code is mainly comprised by low-level instruction sets, which initializes several motherboard components and peripherals when the computer system is powered on. Particularly speaking, the BIOS code will execute a power on self test (POST) to initiate all hardware components of the computer system, interpret messages from a keyboard, and transmit information between connection ports. The initialization of the computer system is completely related to the BIOS code. As a result, the testing of the central processing unit (CPU), the memory and the hard disk of the computer system can not be executed if the BIOS code is incorrect, and this situation leads the computer system to an unsuccessful boot up.

In the conventional architecture of the computer system, the BIOS code is stored in a memory that allows permanent data storage for a long time. The so called BIOS memory is, for example, a flash read-only memory (flash ROM), a programmable read-only memory (PROM), an erasable programmable read-only memory (EPROM) or an electrically erasable programmable read-only memory (EEPROM). The BIOS memory used for storing the BIOS code is embedded into the motherboard or a chipset of the computer system. Therefore, contents of the BIOS code will not be affected by the power off of the computer system, and can be kept in the BIOS memory permanently.

However, the contents stored in the BIOS memory can be varied. For instance, when the computer manufacturer produces a faulty BIOS code or the configuration of the computer system is changed, the BIOS code has to be updated. A system management BIOS (SMBIOS) information is an important and essential data of the BIOS code and requires the most frequently update. The SMBIOS information contains all information related to the computer system and has various data types such as data Type 1, Type 2, Type 3, Type 4, . . . , Type 126. For example, the data Type 1 is the system or manufacturer information, the data Type 2 is the baseboard information, and the data Type 3 if the system enclosure or chassis information. Since each of the computer components has its individual system information, the SMBIOS information should be changed by the variation of the hardware configuration.

Nowadays, there are several tools provided by computer manufacturers for updating the SMBIOS information in the BIOS code, but these tools make the user to directly modify the data stored in the BIOS memory (e.g. flash ROM). Either the incorrect SMBIOS information has been inputted to the BIOS memory or the user wants to retrieve the default value of the SMBIOS information, the user has to flash the whole BIOS memory again. Besides, the power failure of the computer system during the user updates the SMBIOS information stored in the BIOS memory may cause the BIOS code being crashed and lead to the failure of booting the computer system. All these drawbacks make the update of the SMBIOS information become inconvenient and less flexibility.

SUMMARY OF THE INVENTION

Accordingly, the present invention is directed to a method for executing a power on self test (POST) on a computer system. During the POST stage of the computer system, the method updates a basic input/output system (BIOS) code according to a system identification information set by a user so as to initiate the computer system with the updated BIOS code.

The present invention provides a method for updating a SMBIOS information partially. In this method, a user can update the specific SMBIOS information according to the changes of the system configuration so as to boot the computer system successfully.

The present invention is directed to a method for executing a POST on a computer system with a first memory and a second memory, wherein the first memory comprises a first storage block and a second storage block. In the method, the computer system is powered on and runs the POST. Then, a BIOS code stored in the first storage block is loaded to the second memory, wherein the BIOS code comprises a system identification information. After that, the system identification information in the second memory is updated with a partial system identification information set by a user, wherein the partial system identification information is stored in the second storage block. Finally, the computer system is initiated by the BIOS code loaded in the second memory.

According to an embodiment of the present invention, wherein the step of updating the system identification information in the second memory with the partial system identification information includes determining the presence of the partial system identification information in the second storage block, and updating the system identification information in the second memory by the partial system identification information if the partial system identification information is present in the second storage block, or going to the step of initiating the computer system by using the BIOS code loaded in the second memory if the partial system identification information is not present in the second storage block.

According to an embodiment of the present invention, wherein the system identification information comprises a system management BIOS (SMBIOS) information with default value of the computer system. The SMBIOS information has data Type 1, Type 2, Type 3, Type 4, . . . , Type 126. The partial system identification information comprises a partial SMBIOS information set by the user. The partial SMBIOS information has the data Type 1, Type 2 and Type 3.

According to an embodiment of the present invention, wherein the step of updating the system identification information in the second memory with the partial system identification information includes replacing the data Type 1, Type 2 and Type 3 of the SMBIOS information in the second memory by the data Type 1, Type 2 and Type 3 of the partial SMBIOS information.

According to an embodiment of the present invention, wherein the step of updating the system identification information in the second memory with the partial system identification information comprises detecting a predefined signature in the second memory to obtain a starting address of the SMBIOS information in the second memory, and writing the partial SMBIOS information into the corresponding location of the second memory according to the starting address and a length of each of the data Type 1, Type 2 and Type 3.

According to an embodiment of the present invention, an operating system is loaded into the computer system, and the partial system identification information stored in the second storage block is modified by a user input data received by the computer system.

According to an embodiment of the present invention, the second storage block is maintained in a protection mode to prevent the data stored in the second storage block from being erased during an operation of flashing the first memory.

According to an embodiment of the present invention, the first memory comprises a flash read only memory (ROM) and the second memory comprises a random access memory (RAM).

From another point of view, the present invention provides a method for updating a SMBIOS information partially which is suitable for a computer system with a first memory and a second memory. The first memory comprises a first storage block and a second storage block. The first storage block is used for storing a BIOS code and the second storage block is used for storing a partial SMBIOS information inputted by a user. In the method, the computer system is powered to run a POST in the first step. Then, the BIOS code from the first storage block is loaded to the second memory, wherein the BIOS code comprises the SMBIOS information. Finally, the SMBIOS information in the second memory is updated with the partial SMBIOS information stored in the second storage block.

According to an embodiment of the present invention, the step of updating the SMBIOS information in the second memory comprises determining the presence of the partial SMBIOS information in the second storage block and updating the SMBIOS information in the second memory with the partial SMBIOS information if the partial SMBIOS information is present in the second storage block.

According to an embodiment of the present invention, wherein the SMBIOS information is the default identification information of the computer system and comprises data Type 1, Type 2, Type 3, Type 4, . . . , Type 126. And the partial SMBIOS information comprises the data Type 1, Type 2 and Type 3 inputted by the user.

According to an embodiment of the present invention, the step of updating the SMBIOS information in the second memory comprises replacing the data Type 1, Type 2 and Type 3 of the SMBIOS information in the second memory by the data Type 1, Type 2 and Type 3 of the partial SMBIOS information.

According to an embodiment of the present invention, the step of updating the SMBIOS information in the second memory comprises detecting a predefined signature in the second memory to obtain a starting address of the SMBIOS information in the second memory, and writing the partial SMBIOS information to the corresponding location of the second memory according to the starting address and a length of each of the data Type 1, Type 2 and Type 3.

According to an embodiment of the present invention, further comprising maintaining the second storage block in a protection mode to prevent the data stored in the second storage block from being erased during an operation of flashing the first memory.

According to an embodiment of the present invention, further comprising initiating the computer system by using the BIOS code loaded in the second memory, loading an operating system, and receiving a user input data to modify the partial SMBIOS information stored in the second storage block.

According to an embodiment of the present invention, the first memory comprises a flash ROM and the second memory comprises a RAM.

In the present invention, the user can previously input the specific SMBIOS information in the second storage block. And during the POST stage, the default SMBIOS information in the BIOS code which is loaded to the RAM will be updated according to the specific SMBIOS information inputted by the user. As a result, the purpose of using the appropriated SMBIOS information to initiate the computer system can be achieved. Besides, the user updates the SMBIOS information without directly modifying the BIOS code stored in the flash ROM, so as to prevent the BIOS code stored in the flash ROM from being damaged by the incorrect modification performed by the user, and to avoid the failure of booting computer system.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
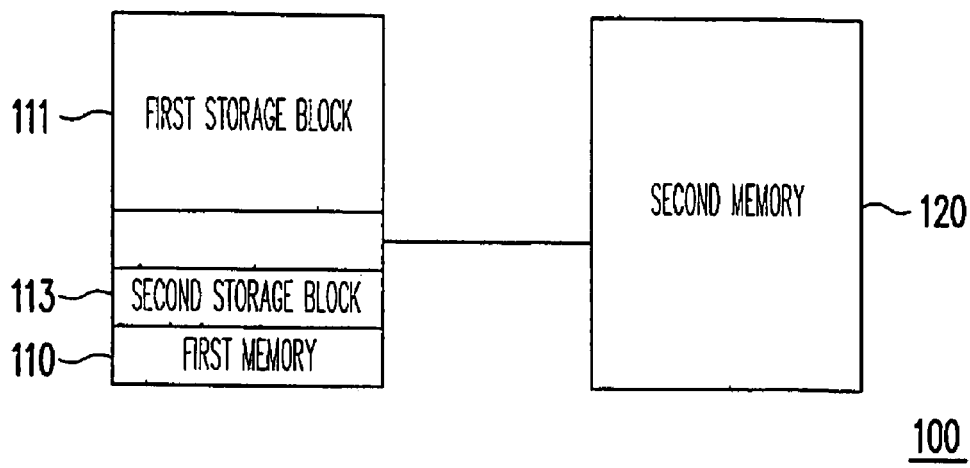
FIG. 1 is a block diagram of memory units in a computer system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of memory units in a computer system according to an embodiment of the present invention. Referring to FIG. 1, the computer system 100 has two memory units, a first memory 110 and a second memory 120. The first memory 110 comprises a first storage block 111 and a second storage block 113 is, for example, a flash read only memory (ROM). And the second memory 120 could be a random access memory (RAM). For instance, the second memory 120 is a double data-rate synchronous DRAM (DDR) or a synchronous DRAM (SDRAM), which is not limited herein.

In the computer system 100, a basic input/output system (BIOS) code for the computer initialization is stored in the first memory 110, and a system identification information is contained in the BIOS code. The system identification information is, for example, a system management BIOS (SMBIOS) information with default value of the computer system 100. The SMBIOS information consists of various hardware information of the computer system 100 and is essential for booting the computer system 100. According to the specification of the SMBIOS information, it comprises different type of data such as data Type 1, Type 2, Type 3, Type 4, . . . , Type 126. For example, the data Type 1 is the system information such as the manufacturer id, product name and the serial number etc. The data Type 2 is information of the baseboard, such as the baseboard manufacturer id, baseboard version or the serial number. And the data Type 3 the information related to the system enclosure or chassis. It should be noted that the data Type 1, Type 2, and Type 3 are different in variant system configuration and need to be updated frequently.

In this embodiment, the second storage block 113 in the first memory 110 will be maintained in a protection mode. That is, the data stored in the second storage block 113 will not be erased by a flashing operation performed on the whole first memory 110. Moreover, the data stored in the second storage block 113 can only be modified or deleted by executing a specific software. For example, the user can input a partial system identification information to the second storage block 113 by using the specific software, wherein the partial system identification information is a partial SMBIOS information comprises the data Type 1, Type 2 and Type 3.

Figure 2:
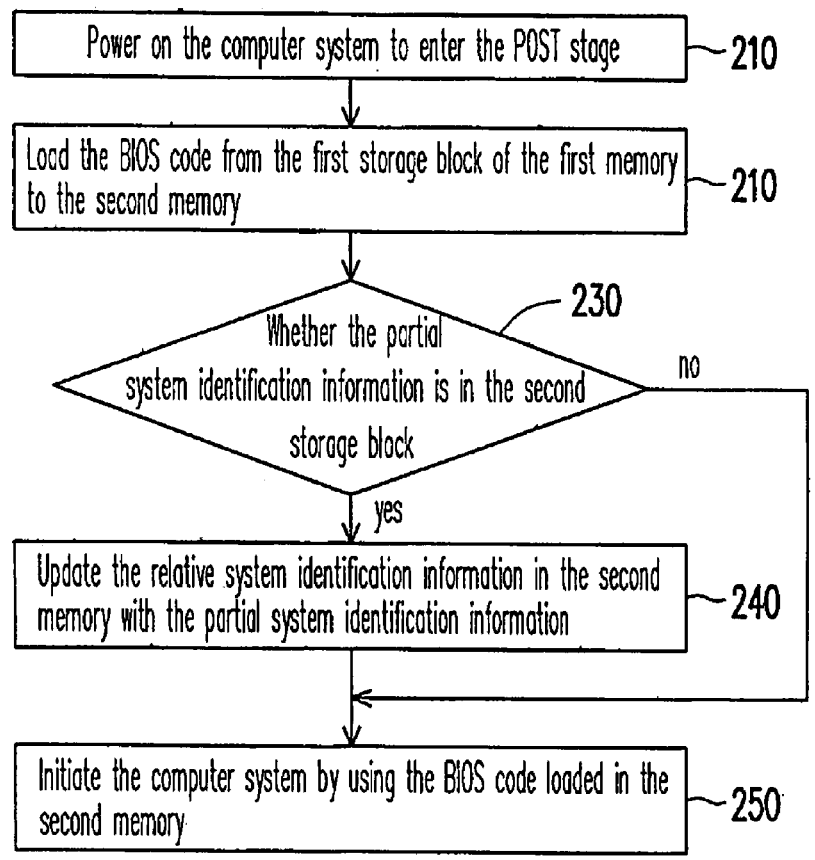
FIG. 2 is a flow chart of the method for executing a power on self test (POST) on the computer system and updating a system management BIOS (SMBIOS) information partially according to the embodiment of the present invention.

In order to illustrate the flow of executing a power on self test (POST) and updating the SMBIOS information partially of the present invention in detail, the following embodiment is provided to further illustrate the present invention performed on the computer system 100. FIG. 2 is a flow chart of the method for executing the POST on the computer system and updating the SMBIOS information partially according to the embodiment of the present invention. Referring to both FIG. 1 and FIG. 2, after a user presses the power button of the computer system 100, the computer system 100 run the POST in step 210.

Then, in step 220, the BIOS code stored in the first storage block 111 of the first memory 110 will be loaded to the second memory 120. In the embodiment, the BIOS code contains the system identification information such as the SMBIOS information, and the SMBIOS information has various type of data (e.g. data Type 1, Type 2, Type 3, Type 4, . . . , Type 126).

After loading the BIOS code to the second memory 120, the present of the partial system identification information (such as the partial SMBIOS information) in the second storage block 113 is determined in step 230. If it is determined that no partial system identification information is stored in the second storage block 113, that means the user wants to boot the computer system 100 with the default SMBIOS information. As shown in step 250, the BIOS code loaded to the second memory 120 will be directly used to initiate the computer system 100.

However, if the user had inputted the partial system identification information into the second storage block 113 before, in step 240, the system identification information in the BIOS code loaded into the second memory 120 will be updated with the partial system identification information stored in the second storage block 113. In this embodiment, the data Type 1, Type 2 and Type 3 of the SMBIOS information in the second memory 120 is replaced by the data Type 1, Type 2 and Type 3 of the partial SMBIOS information stored in the second storage block 113.

Figure 3:
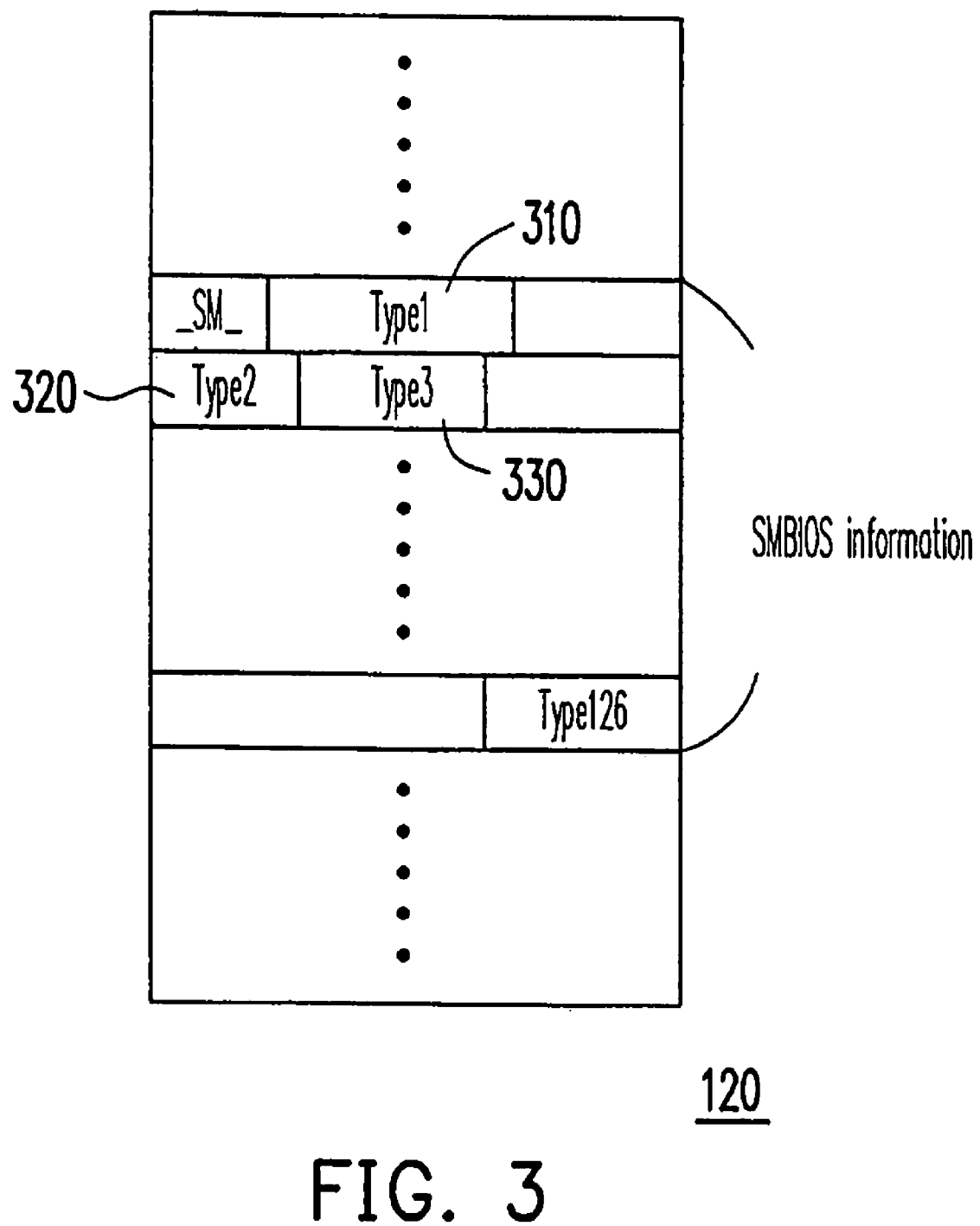
FIG. 3 is a diagram of the partial second memory according to an embodiment of the present invention.

In this embodiment, all types of data are stored sequentially in the second memory 120 as shown in FIG. 3, so in order to achieve the replacement, a predefined signature (e.g. "_SM_") is detected in the second memory 120 to obtain a starting address of the SMBIOS information. Since the length of data Type 1, Type 2 and Type 3 are defined in the specification of the SMBIOS information, after obtaining the starting address of the SMBIOS information in the second memory 120, the partial SMBIOS information can be wrote into the corresponding location of the second memory 120 according to the starting address and the lengths of the data Type 1, Type 2 and Type 3.

For example, since the data Type 1 is the first data type of the SMBIOS information and follows the "_SM_" signature, so after obtaining the starting address of the SMBIOS information, the starting address of the block 310 to store the data Type 1 can be determined. Consequently, the data Type 1 of the partial SMBIOS information can be wrote into the block 310 of the second memory 120. Similarly, the starting address of the block 320 to store the data Type 2 can be determined by adding the starting address of the SMBIOS information and the length of data Type 1 together. Thus the data Type 2 of the partial SMBIOS information can be wrote into the block 320 accordingly. In the same way, the starting address of the block 330 can be determined by adding the starting address of the SMBIOS information and the lengths of the data Type 1 and Type 2 together. And the data Type 3 of the partial SMBIOS information can be wrote into the second memory 120 according to the starting address of the block 330. It should be noted about that, the sequence order of updating the data Type 1, Type 2 or Type 3 is not limited in the present embodiment.

After that, as step 250 shown in FIG. 2, the BIOS code loaded in the second memory 120 with the data Type 1, Type 2 and Type 3 previously inputted by the user is used for initiating the computer system 100. An operation system such as the DOS operating system is loaded into the computer system 100 after the hardware initialization is completed, and the booting of the computer system 100 is finished then.

In one embodiment, after the operating system is loaded into the computer system 100, the user can execute the specific software to modify the data Type 1, Type 2 and Type 3 stored in the second storage block 113. That is, when the configuration of the computer system 100 is changed, the user can modify the corresponding SMBIOS information in the second storage block 113. And the SMBIOS information set by the user will partially replace the original SMBIOS information loaded in the second memory 120 during the POST stage so as to boot the computer system 100 successfully. On the other hand, if the user inputs the incorrect information value or wants to retrieve the default SMBIOS information, he/she only needs to erases the second storage block 113 by the specific software and reboots the computer system 100, the BIOS code with the default SMBIOS information will be loaded into the second memory 120 and used for initiating the computer system 100.

In view of the above, the present invention provides a method for executing the POST on the computer system and updating the SMBIOS information partially. According to the above embodiments, the present invention at least includes the following advantages.

1. To initiate the computer system with the BIOS code contains the partial SMBIOS information set by the user, so as to increase the flexibility of booting the computer system.

2. The method lets the user to modify the SMBIOS information stored in a specific storage block instead of modifying the BIOS code directly. Consequently, the situation of setting the incorrect SMBIOS information that leads to the failure in booting can be avoided.

3. Provide a flexible and save way for the user to update the SMBIOS information partially, and ensure the booting of the computer system can be done successfully.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for executing a power on self test (POST) on a computer system, suitable for the computer system with a first memory and a second memory, wherein the first memory comprises a first storage block and a second storage block, the method comprising:
   powering the computer system to run the POST;
   loading a basic input/output system (BIOS) code from the first storage block to the second memory, wherein the BIOS code comprises a system identification information;
   determining presence of a partial system identification information in the second storage block, wherein the partial system identification information is set by a user;
   if the partial system identification information is present in the second storage block, updating the system identification information in the second memory with the partial system identification information; and
   if the partial system identification information is not present in the second storage block, initiating the computer system by using the BIOS code loaded in the second memory.

2. The method as claimed in claim 1, wherein the system identification information comprises a system management BIOS (SMBIOS) information with default value of the computer system, wherein the SMBIOS information comprises data Type 1, Type 2, Type 3, Type4, . . . , Type 126.

3. The method as claimed in claim 2, wherein the partial system identification information comprises a partial SMBIOS information set by the user, wherein the partial SMBIOS information comprises the data Type 1, Type 2 and Type 3.

4. The method as claimed in claim 3, wherein the step of updating the system identification information in the second memory with the partial system identification information comprises:
   replacing the data Type 1, Type 2 and Type 3 of the SMBIOS information in the second memory by the data Type 1, Type 2 and Type 3 of the partial SMBIOS information.

5. The method as claimed in claim 3, wherein the step of updating the system identification information in the second memory with the partial system identification information comprises:
   detecting a predefined signature in the second memory to obtain a starting address of the SMBIOS information in the second memory; and
   writing the partial SMBIOS information to the corresponding location of the second memory according to the starting address and a length of each of the data Type 1, Type 2 and Type 3.

6. The method as claimed in claim 1, further comprising:
   loading an operating system; and
   receiving a user input data to modify the partial system identification information stored in the second storage block.

7. The method as claimed in claim 1, further comprising:
   maintaining the second storage block in a protection mode to prevent the data stored in the second storage block from being erased during an operation of flashing the first memory.

8. The method as claimed in claim 1, wherein the first memory comprises a flash read only memory (ROM).

9. The method as claimed in claim 1, wherein the second memory comprises a random access memory (RAM).

10. A method for updating a SMBIOS information partially, suitable for a computer system with a first memory and a second memory, wherein the first memory comprises a first storage block for storing a BIOS code and a second storage block for storing a partial SMBIOS information inputted by a user, the method comprising:
    powering the computer system to run a POST;
    loading the BIOS code from the first storage block to the second memory, wherein the BIOS code comprises the SMBIOS information;
    determining presence of the partial SMBIOS information in the second storage block; and
    if the partial SMBIOS information is present in the second storage block, updating the SMBIOS information in the second memory with the partial SMBIOS information.

11. The method as claimed in claim 10, wherein the SMBIOS information is the default identification information of the computer system and comprises data Type 1, Type 2, Type 3, Type4, . . . , Type 126.

12. The method as claimed in claim 11, wherein the partial SMBIOS information comprises the data Type 1, Type 2 and Type 3.

13. The method as claimed in claim 12, wherein the step of updating the SMBIOS information in the second memory comprises:
    replacing the data Type 1, Type 2 and Type 3 of the SMBIOS information in the second memory by the data Type 1, Type 2 and Type 3 of the partial SMBIOS information.

14. The method as claimed in claim 12, wherein the step of updating the SMBIOS information in the second memory comprises:
    detecting a predefined signature in the second memory to obtain a starting address of the SMBIOS information in the second memory; and
    writing the partial SMBIOS information to the corresponding location of the second memory according to the starting address and a length of each of the data Type 1, Type 2 and Type 3.

15. The method as claimed in claim 10, further comprising:
    maintaining the second storage block in a protection mode to prevent the data stored in the second storage block from being erased during an operation of flashing the first memory.

16. The method as claimed in claim 10, further comprising:
    initiating the computer system by using the BIOS code loaded in the second memory;
    loading an operating system; and
    receiving a user input data to modify the partial SMBIOS information stored in the second storage block.

17. The method as claimed in claim 10, wherein the first memory comprises a flash ROM.

18. The method as claimed in claim 10, wherein the second memory comprises a RAM.

* * * * *